UNITED STATES PATENT OFFICE.

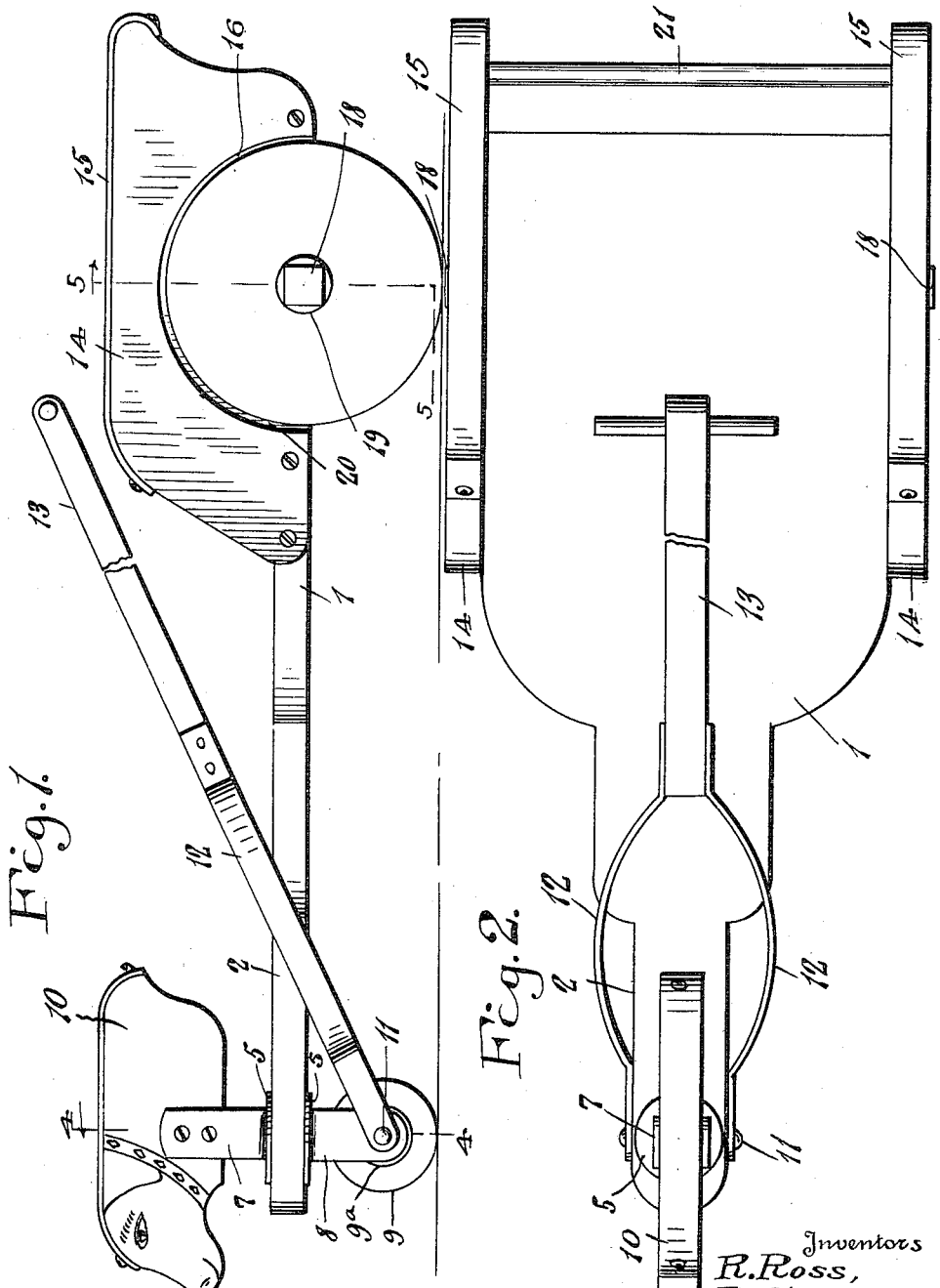

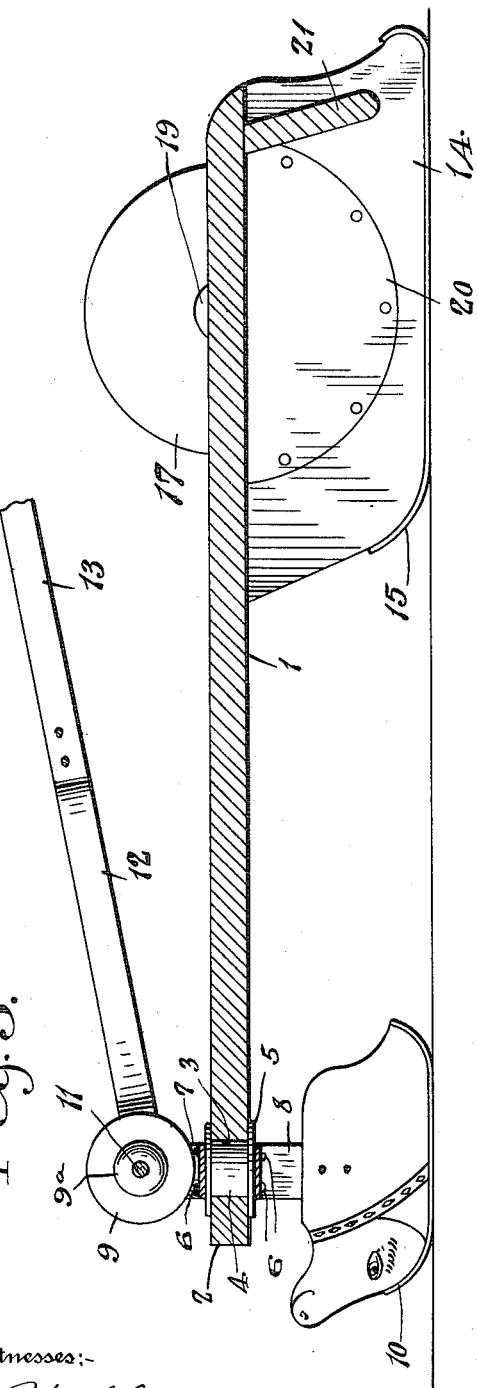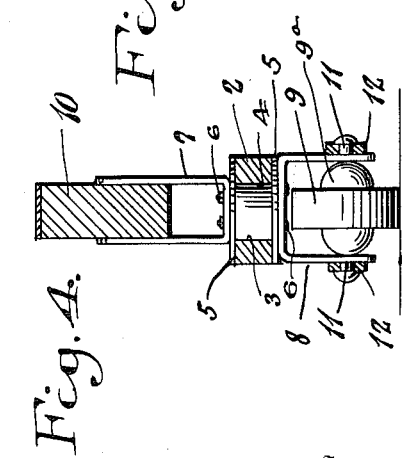

ROBERT ROSS, OF MEDFORD AND LOUIS SCORE, OF WINTHROP, MASSACHUSETTS.

COMBINATION SLED AND CART.

1,284,460.      Specification of Letters Patent.      Patented Nov. 12, 1918.

Application filed November 21, 1917. Serial No. 203,197.

*To all whom it may concern:*

Be it known that we, ROBERT ROSS, a subject of the King of Great Britain, residing at Medford, in the county of Middlesex and State of Massachusetts, and LOUIS SCORE, a citizen of the Republic of Russia, residing at Winthrop, in the county of Suffolk and State of Massachusetts, have invented certain new and useful Improvements in Combination Sleds and Carts; and we do hereby declare the following to be a full, clear, and exact description of the invention, such as will enable others skilled in the art to which it appertains to make and use the same.

The invention relates to a combination sled and cart.

The object of the present invention is to provide a simple, practical and efficient combination sled and cart of strong, durable and inexpensive construction adapted to be readily arranged for use as either a cart or a sled by simply turning it over from one side to the other and without the removal of any of the parts.

It is also an object of the invention to provide a combination sled and cart of this character having a handle adapted to be readily swung over the front of the device so that the same may be steered either as a sled or a cart while the occupant is sitting or standing or lying upon the combined cart and sled.

With these and other objects in view, the invention consists in the construction and novel combination of parts hereinafter fully described, illustrated in the accompanying drawings and pointed out in the claims hereto appended; it being understood that various changes in the form, proportion, size and minor details of construction, within the scope of the claims, may be resorted to without departing from the spirit of sacrificing any of the advantages of the invention.

In the drawings:

Figure 1 is a side elevation of a combined cart and sled constructed in accordance with this invention.

Fig. 2 is a plan view of the same.

Fig. 3 is a central longitudinal sectional view of the combined cart and sled.

Fig. 4 is a transverse sectional view on the line 4—4 of Fig. 1.

Fig. 5 is a similar view on the line 5—5 of Fig. 1.

Like numerals of reference designate corresponding parts in all the figures of the drawings.

In the accompanying drawings, in which is illustrated the preferred embodiment of the invention, the combined cart and sled comprises in its construction a bottom board 1 provided with a reduced front portion 2 having a front opening 3 of circular form receiving a pivot 4 preferably constructed of wood and having upper and lower disks or plates 5 secured to it by bolts 6. The pivot 4, which is arranged loosely in the opening 2, is adapted to turn freely in the same and the bolts 6 pierce the disks or plates and the said pivot 4. The pivot has mounted upon it forks 7 and 8 constructed of suitable metal and preferably secured to the pivot by the said bolts. The fork 7 is relatively narrow and it receives a steering runner 10, while the other fork is relatively wide and receive a steering wheel 9 having a relatively large hub 9ª through which passes an axle 11. The shaft or axle 11 also connects a fork 12 of a handle 13 to the front steering wheel and the enlargements of the hub space the sides of the fork of the handle a sufficient distance to enable the handle to swing over the front of the bottom board so as to arrange the handle to suit either the sled or the cart and the said handle forms a steering member and will enable the cart or sled to be steered while the occupant is either sitting, standing or lying upon the device.

The device is equipped at the back with relatively large runners 14 having shoes 15 and secured to the side edges of the bottom board by screws or other suitable fastening devices. The relatively large runners 14 are provided with segmental recesses 16 for the reception of relatively large rear wheels 17 which support the rear portion of the device when the same is used as a cart. The wheels are arranged in the same vertical planes as the relatively large rear runners and they are mounted on lag screws 18, inner and outer washers being provided for preventing the wheels from being worn at the inner and outer sides thereof. The runners, which form the sides of the body of the cart when the same is used as a cart, are equipped with segmental guards constructed of sheet metal or other suitable material and arranged to cover the recesses 16 at inner faces of the sides of the runners to prevent the occupant from coming in contact with the wheels when the device is used as a cart.

The combined cart and sled is equipped with a transversely disposed back board 21 extending across the space between the rear runners and secured to the same and to the bottom board and adapted to reinforce and strengthen both the runners and the bottom board.

The combined cart and sled may be constructed of any suitable material and of any desired size and it is compactly arranged so that it will require less space in both shipping and storing than an ordinary cart or sled and it provides a simple, practical and pleasing toy which is adapted to be used in both winter and summer and which does not require the removal of any of the parts so that the same will not become lost.

The small steering runner is shown shaped and painted to represent the head of a dog but it may have any other ornamental appearance as will be readily understood, and the combined sled and cart may be finished in any desired manner.

What is claimed is:

1. A combination sled and cart including a bottom board, runners secured to the bottom board at the sides thereof and projecting from one of the side faces of the same, wheels permanently mounted on the said board and projecting at the opposite face of the same, said runners and wheels being adapted to be arranged upon the ground by reversing the device, and a steering device provided at the opposite faces of the board with a wheel and a runner.

2. A combined cart and sled including a board, runners secured to the side edges of the board and projecting at one face thereof and provided with segmental recesses, and wheels mounted on the board in the segmental recesses of the runners and projecting from the opposite face of the board from that at which the runners project.

3. A combined cart and sled including a board, runners secured to the side edges of the board and projecting at one face thereof and provided with segmental recesses, wheels mounted on the board in the segmental recesses of the runners and projecting from the opposite face of the board from that at which the runners project, and guards secured to the inner faces of the runners at the said segmental recesses.

4. A combined cart and sled including a board, runners secured to the side edges of the board and projecting at one face thereof and provided with segmental recesses, wheels mounted on the board in the segmental recesses of the runners and projecting from the opposite face of the board from that at which the runners project, and a transverse back board located in rear of the recesses and the wheels and extending across the space between the runners and secured to the same and to the bottom board.

5. A combined cart and sled including a bottom board having runners and wheels at its rear portion projecting from the opposite faces of the bottom board, a pivot mounted at the front portion of the bottom board, a wheel carried by the pivot and located at one face of the bottom board, and a runner also carried by the said pivot and located at the opposite face of the bottom board.

6. A combined cart and sled including a bottom board having runners and wheels at its rear portion projecting from the opposite faces of the bottom board, a pivot mounted at the front portion of the bottom board, a wheel carried by the pivot and located at one face of the bottom board, a runner also carried by the said pivot and located at the opposite face of the bottom board, and a handle having a fork arranged to straddle the front portion of the bottom board and connected with the said wheel.

7. A combined cart and sled including a bottom board having runners and wheels at its rear portion projecting from the opposite faces of the bottom board, said bottom board being provided at the front with an opening, a pivot arranged in the opening, disks or plates secured to the pivot and located at the opposite faces of the board, forks mounted upon the disks or plates, a runner secured in one of the forks, and a wheel mounted in the other fork.

8. A combined cart and sled including a bottom board having runners and wheels at its rear portion projecting from the opposite faces of the bottom board, said bottom board being provided at the front with an opening, a pivot arranged in the opening, disks or plates secured to the pivot and located at the opposite faces of the board, forks mounted upon the disks or plates, a runner secured in one of the forks and a wheel mounted in the other fork, said wheel being provided with hub enlargements, and a handle having a fork connected with the wheel at opposite sides of the said enlargement and adapted to swing over the front portion of the bottom board.

In testimony whereof we affix our signatures in presence of witnesses.

ROBERT ROSS.

Witness for Robert Ross:
  JACK SIOVE.

LOUIS SCORE.

Witness for Louis Score:
  G. W. SLOBODKIN.